(12) United States Patent
Ohji et al.

(10) Patent No.: US 7,766,118 B2
(45) Date of Patent: Aug. 3, 2010

(54) ENGINE BRACKET

(75) Inventors: Akira Ohji, Inuyama (JP); Kazushi Saikusa, Ebina (JP)

(73) Assignees: Tokai Rubber Industries, Ltd., Komaki-shi (JP); Nissan Motor Co., Ltd., Yokohama-shi (JP)

( * ) Notice: Subject to any disclaimer, the term of this patent is extended or adjusted under 35 U.S.C. 154(b) by 357 days.

(21) Appl. No.: 11/898,170

(22) Filed: Sep. 10, 2007

(65) Prior Publication Data
US 2008/0073479 A1  Mar. 27, 2008

(30) Foreign Application Priority Data
Sep. 22, 2006  (JP) .................. 2006-257723

(51) Int. Cl.
*B60K 1/00* (2006.01)
(52) U.S. Cl. ................ 180/291; 180/312; 180/295; 180/299; 180/300; 180/311; 248/634; 248/635; 248/636; 248/637; 248/638
(58) Field of Classification Search .......... 248/200; 180/291
See application file for complete search history.

(56) References Cited
U.S. PATENT DOCUMENTS
5,074,374 A * 12/1991 Ohtake et al. ............ 180/312

6,962,229 B2 * 11/2005 Miyahara .................. 180/291
7,458,565 B2 * 12/2008 Miyahara ............... 267/140.11
2005/0121250 A1 * 6/2005 Miyahara .................. 180/291

FOREIGN PATENT DOCUMENTS

| JP | A-11-091620 | 4/1999 |
| JP | A-2002-002310 | 1/2002 |
| JP | A-2002-240574 | 8/2002 |
| JP | A-2003-327155 | 11/2003 |

\* cited by examiner

*Primary Examiner*—J. Allen Shriver, II
*Assistant Examiner*—Alaeddin Mohseni
(74) *Attorney, Agent, or Firm*—Oliff & Berridge, PLC

(57) ABSTRACT

An engine bracket including: an attachment portion provided in a fixing location adapted to be fixed to at least one of the vehicle body and power unit; a bolt hole being formed in the attachment portion so that the attachment portion is fixed to the vehicle body or power unit by a fixing bolt inserted into the bolt hole; and at lease one breaking groove formed at an area located spaced away from the bolt hole so as to extend away from the bolt hole and toward an outer peripheral edge of the attachment portion on at least one of opposite surfaces of the attachment portion in a direction in which the fixing bolt is inserted.

13 Claims, 6 Drawing Sheets

ENGINE BRACKET

INCORPORATED BY REFERENCE

The disclosure of Japanese Patent Application No. 2006-257723 filed on Sep. 22, 2006 including the specification, drawings and abstract is incorporated herein by reference in its entirety.

BACKGROUND OF THE INVENTION

1. Field of the Invention

The present invention relates to an engine bracket that is used for mounting of an engine mount installed between a vehicle body and a power unit in order to join the vehicle body and power unit to each other.

2. Description of the Related Art

Generally, an engine mount, which is installed on a vehicle to elastically mount the power unit on the vehicle body, is attached to the power unit or the vehicle body via an engine bracket. That is, an engine bracket is used to attach an engine mount to the power unit or the vehicle body in order to deal with the various configuration of an engine mount attachment portion of such a power unit and a vehicle body.

A power unit supporting structure allowing the power unit to be detached from the vehicle body during collisions has been scrutinized recently as a means for improving passenger safety during automotive vehicle collisions. As one measure for realizing such a power unit supporting structure, there has been proposed an engine bracket that is broken upon significant impact load during collisions, thereby allowing the power unit to be detached. A specific example has been disclosed in JP-A-2003-327155.

The engine bracket disclosed in JP-A-2003-327155 is such that notches are formed in the inner peripheral surface of bolt tightening holes, which are secured to the power unit, so that the bolt tightening holes are broken relatively easily by the impact load during vehicle collisions, breaking the connection by the engine bracket between the power unit and vehicle body, and thereby allowing the power unit to split off from the vehicle. However, investigation by the present inventors revealed that the engine bracket with the conventional structure described in JP-A-2003-327155 does not allow the required performance to be achieved very well.

That is, before becoming broken by the input of collision load during vehicle collisions as described above, the engine brackets must function to allow the power unit to be joined and supported in a stable manner against the vehicle body (engine mount) during ordinary driving conditions. In the engine bracket disclosed in JP-A-2003-327155, however, notches are formed in the inner peripheral surface of the bolt tightening holes, which are the seating surface of the fixing bolts, and these notches inevitably reduce the area of the surface on which the tightening force of the fixing bolts may act. Particularly, when larger sized, or greater numbers of, notches must be provided in the inner peripheral surface of the bolt tightening holes in order to more consistently ensure that the intended breakage will occur, a resulting concern is that it may become more difficult to sufficiently increase the bolt tightening force, and more difficult to ensure a high level of reliability by ensuring stable power unit support strength over a long period of time.

To effectively ensure power unit support strength and corresponding power unit support reliability, the size and number of the notches formed in the inner peripheral surface of the bolt tightening hole of the engine bracket may sometimes become limited, with the resulting risk that it may become more difficult to ensure the target breakage during vehicle collisions and more difficult to ensure that the power unit will consistently be detached. This in turn results in the risk of greater difficulties in effectively improving passenger safety during collisions.

Furthermore, because notches are formed in the bolt seat surface in the engine bracket described in JP-A-2003-327155, the effect in decreasing the break strength by the notches is substantially affected by the bolt tightening strength relative to both sides of the bolt tightening hole. That is, despite the formation of the notches, when the fixing bolts are tightened in an extremely firm manner, a resulting risk is that the intended breakage might not come about because of the high strength manifested by the bolt as a rigid body in the seat surface as a whole. On the other hand, if the fixing bolt is tightened in a relatively loose manner, breakage tends to occur as a result of the increase in the substantial stress concentration factor in the portions where the notches are located, without any show of strength by the bolt as rigid body in the seat surface as a whole. Consequently, differences in the strength by which the fixing bolt is tightened to the bolt seat surface can result in different breakage results, making it difficult to ensure consistent target breaking performance.

SUMMARY OF THE INVENTION

It is therefore one object of this invention to an engine bracket having a novel structure capable of better breaking performance consistently resulting in the intended breakage during vehicle collisions as well as stable power unit support performance when running normally.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

According to the principle of the present invention, there is provided an engine bracket that is installed between a vehicle body and a power unit for the vibration damping support of the power unit relative to the vehicle body, the engine bracket including: a fixing location adapted to be fixed to at least one of the vehicle body and power unit; an attachment portion provided in the fixing location and formed with a bolt hole so that the attachment portion is fixed to the vehicle body or power unit by a fixing bolt inserted into the bolt hole; and at least one breaking groove formed at an area located spaced away from the bolt hole so as to extend away from the bolt hole and toward an outer peripheral edge of the attachment portion on at least one of opposite surfaces of the attachment portion in a direction in which the fixing bolt is inserted.

In the engine bracket of construction according to the invention, the breaking groove is formed in the engine bracket attachment portion so that the engine bracket attachment portion will be broken along the breaking groove by the collision load input during vehicle collisions. The vehicle body and power unit which have been joined together by the engine brackets are separated when the engine brackets break, preventing the power unit from intruding into the cab during vehicle collisions so as to ensure passenger safety.

In addition, the breaking groove in the engine bracket related to the present invention is formed in a region outer peripherally spaced apart from the bolt hole which is formed in the attachment portion, and extends toward the outer peripheral end edge of the attachment portion. As a result, a surface with no breaking groove formed along a certain region is formed between the bolt hole and breaking groove in the radial direction of the bolt hole. It is thus possible to ensure sufficient area on the surface subject to the tightening force of the fixing bolt inserted into the bolt hole, and to ensure that the engine bracket and power unit or vehicle body are joined well by the fixing bolts.

It is also possible in the engine bracket of the present invention to suitably adjust the required fixing bolt tightening force and the required engine bracket breaking strength by, for example, suitably adjusting the width, depth, length, or the like of the breaking groove (location of the end of the breaking groove on the bolt hole side).

In one preferred form of the present engine bracket, the breaking groove in the engine bracket of the present invention is formed in a region outside the outer peripheral side of a surface subject to a tightening force of the fixing bolt in the attachment portion.

This will ensure greater area on the surface subject to the tightening force of the fixing bolt, allowing the engine bracket and power unit or vehicle body to be joined even better. The surface subject to the tightening force of the fixing bolt in the engine bracket refers to the surface on which the head of the fixing bolt is superposed, the surface where a member such as a nut screwed to the fixing bolt is superposed, the surface where the washer between the engine bracket and the nut or head of the fixing bolt is superposed, or the like.

In another preferred form of the present engine bracket, one end of the breaking groove on a bolt hole side is formed in a surface subject to a tightening force of the fixing bolt in the attachment portion.

This makes it possible to advantageously increase the degree of freedom in setting the breaking strength of the engine bracket. The required fixing bolt tightening force and the engine bracket breaking strength can therefore be more effectively controlled to ensure passenger safety, particularly during collisions or the like.

In another preferred form of the present engine bracket, wherein the attachment portion includes a fitting recess formed in a surface on which is superposed a fixing member of the power unit or vehicle body in a direction in which the fixing bolt is inserted in the attachment portion for preventing the fixing member from rotating around the fixing bolt, and the breaking groove is formed in a region to an outside of the fitting recess.

According to this arrangement, the fitting recess is formed in the engine bracket, and either the power unit or vehicle body is fitted to the fitting recess, thereby preventing the relative rotation of the power unit or vehicle body relative to the engine bracket. The vehicle body and power unit can therefore be readily positioned in the desired direction and assembled. In addition, forming the breaking groove in a region away from the location where the fitting recess is formed makes it possible to increase the surface area of the surface where the power unit or vehicle body and the floor of the fitting recess overlap. It will therefore be possible to obtain sufficient tightening force by the fixing bolt, ensuring that the power unit or vehicle body will be firmly attached to the attachment portion (fitting recess). Additionally, forming the breaking groove in a region away from the fitting recess can prevent loss of strength in the fitting recess to which the power unit or vehicle body is attached, ensuring that the power unit and vehicle body are joined and supported in a stable manner during ordinary running conditions.

In another preferred form of the present engine bracket, a first direction in which a load acts on the fixing bolt during vehicle collisions and a second direction in which the breaking groove extends are preferably at an angle $\theta$ of $20° \leq \theta \leq 60°$.

According to this arrangement, the direction in which the breaking groove extends is inclined at a certain angle of gradient relative to the direction in which the load acts on the fixing bolt during collisions, so that the attachment portion breaks in a consistent manner during vehicle collisions. It is thus possible to better ensure passenger safety during vehicle collisions.

In another preferred form of the present engine bracket, the at least one breaking groove comprises a plurality of breaking grooves.

Thus forming a plurality of breaking grooves that lead to the breakage of the engine brackets during collisions will ensure more consistent breakage of the engine brackets during vehicle collisions, affording even better safety during collisions.

In another preferred form of the present engine bracket, the at least one breaking grooves comprise two breaking grooves, and the two breaking grooves are slant with respect to a first direction in which the load acts on the fixing bolt during vehicle collisions with a same angle.

This will ensure that the engine brackets break more consistently during vehicle collisions, ensuring even better safety through the separation of the power unit.

In another preferred form of the present engine bracket, the attachment portion is of panel shape that expands horizontally, and the bolt hole is formed vertically through the attachment portion.

Since the attachment portion has the shape of panel, the attachment portion is likely to break more consistently during vehicle collisions, ensuring even better passenger safety.

In another preferred form of the present engine bracket, the engine bracket further comprises a main panel portion extending in a longitudinal direction of the vehicle, wherein the attachment portion is formed integrally at one end of the main panel portion in the longitudinal direction of the vehicle, one of the power unit and vehicle body being fixable thereto, and a fixing panel portion that expands in a lateral direction of the vehicle at right angles to the main panel portion is formed integrally with the other end of the main panel portion in the longitudinal direction of the vehicle, an other of the power unit and vehicle body being fixable thereto.

This arrangement will fix the power unit and vehicle body to both ends of the engine bracket in the longitudinal direction of the vehicle, permitting even better detachment of the power unit from the vehicle body during collisions. Passenger safety can thus be better ensured.

In another preferred form of the present engine bracket, the engine bracket further comprises a reinforcing panel portion integrally formed with the main panel portion and fixing panel portion, and extending perpendicular to both of the main panel portion and fixing panel portion.

The engine bracket having a fixing panel portion and a main panel portion in the form of a panel can thus be provided with a reinforcing panel portion that expands perpendicularly to either the main panel portion or fixing panel portion to ensure that the power unit is joined to and supported against the vehicle body in a stable manner, wherein the engine bracket is sufficiently rigid, while the engine bracket is lighter.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
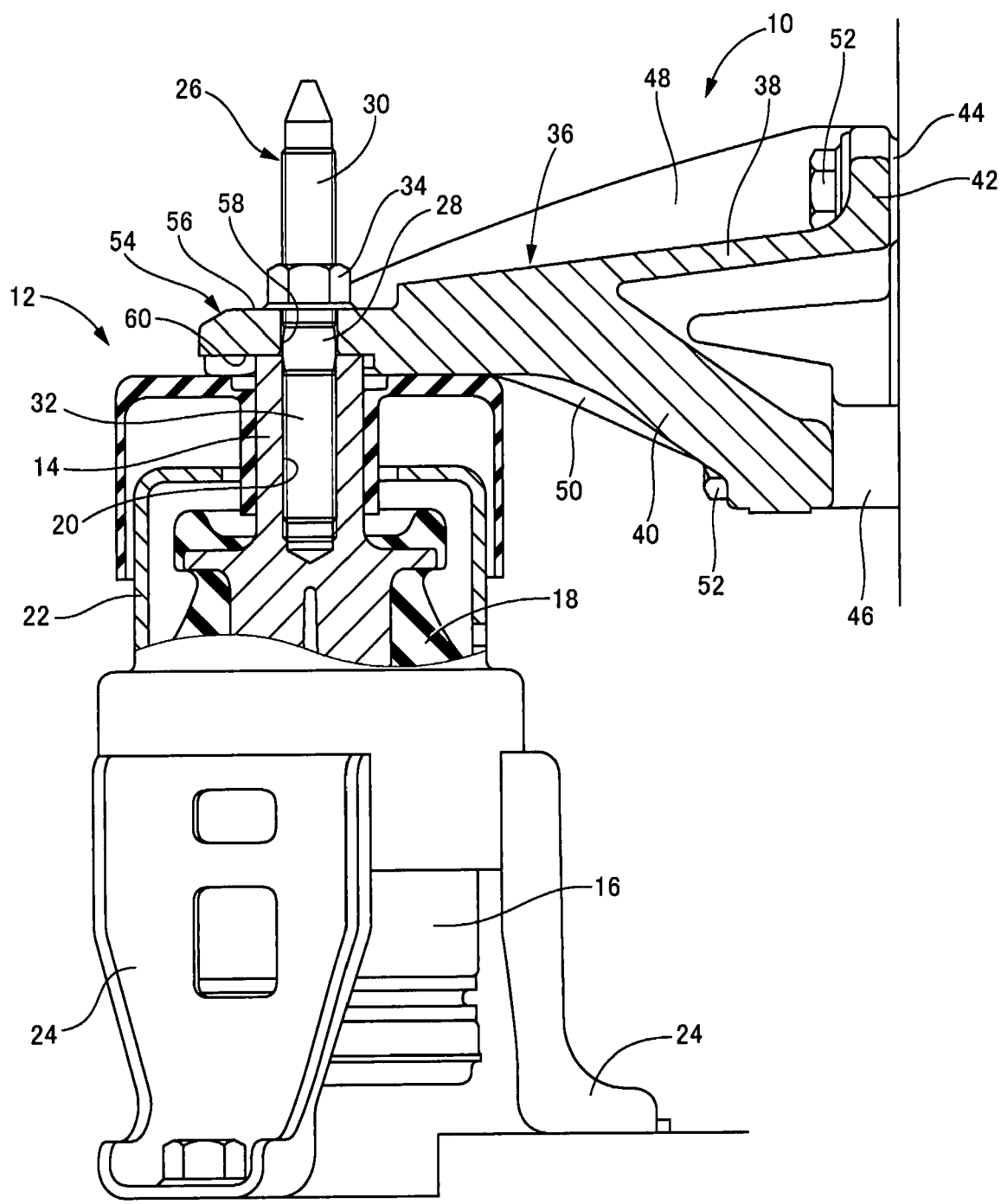
FIG. 1 is a portionially cross sectional view showing an engine bracket of construction according to the present invention that is used for mounting an engine mount to a vehicle body.

FIG. 1 illustrates an engine bracket 10 for automotive vehicles, which is used for mounting an engine mount 12 on an automotive vehicle. The engine mount 12 is fixedly attached to the engine bracket 10. In the description hereinbelow, a vertical direction refers, as a rule, to the vertical direction in FIG. 1 that corresponds to the generally vertical direction.

The engine mount 12 has a structure such that a first mounting member 14 in the form of a thick, small-diameter cylinder and a second mounting member 16 in the form of a thin, large-diameter cylinder are disposed co-axially, and the first mounting member 14 and second mounting member 16 are elastically connected together by a generally frustoconical main rubber elastic body 18. The structure of the engine mount 12 is not particularly limited, and engine mounts having a variety of well known structures can be used. That is, the specific structure of the engine mount 12 is not an important portion of the present invention, and the engine mount 12 will not be described in detail here.

A bolt hole 20 that opens in the axial upward direction is formed in the first mounting member 14 in the engine mount 12. The bolt hole 20 is a round hole extending axially with a generally constant cross sectional shape, with female threading engraved along generally the entire length of the inner peripheral surface.

An implanted bolt 26 serving as a fixing bolt is screwed into the bolt hole 20 of the first mounting member 14. The implanted bolt 26 has a grip 28 in the axial intermediate portion, where the upper and lower parts 30 and 32 of the bolt protruding axially on either side of the grip 28 are integrally formed with the grip 28. The lower part of the bolt 32 extending axially downward is screwed into the bolt hole 20 of the first mounting member 14, so that the implanted bolt 26 is implanted in the first mounting member 14, with the upper part of the bolt 30 protruding upward from the first mounting member 14.

An outer bracket 22 in the form of a large-diameter cylinder is externally fitted and fixed to the second mounting member 16. Attachment legs 24 are formed in a plurality of locations on the periphery of the outer bracket 22. The attachment legs 24 are in the form of curved panels that extend vertically, expanding peripherally to a certain length. The bottom ends of the attachment legs 24 are curved in the shape of flanges in the radial outward direction, and through holes (not shown) are formed in the flange-shaped curved parts.

The first mounting member 14 of the engine mount 12 having this structure is fixedly attached to the engine bracket 10, and the second mounting member 16 is fixedly attached to the vehicle body.

That is, the upper part of the bolt 30 of the implanted bolt 26 protruding upward from the first mounting member 14 is inserted into the engine bracket 10, and a connecting nut 34 is screwed to the upper part of the bolt 30 so that the first mounting member 14 and the engine bracket 10 are tightened together. Meanwhile, the bottom ends of the attachment legs 24 of the second mounting member 16 are placed atop and bolted to the vehicle body (not shown), and is thereby fixedly attached by the outer bracket 22 to the vehicle body.

The engine bracket 10 fixed to the engine mount 12 is in the shape of a panel overall, as shown in FIGS. 2-7, and is formed of a rigid material such as aluminum alloy or cast iron. Specifically, in this embodiment, the engine bracket 10 is formed by casting an aluminum alloy-based material, and the various parts of the engine bracket 10 are formed as an integrally formed product. In the following description, the longitudinal direction of the vehicle refers to the left-right direction in FIG. 2, and the left-right direction of the vehicle refers to the vertical direction in FIG. 2.

Figure 2:
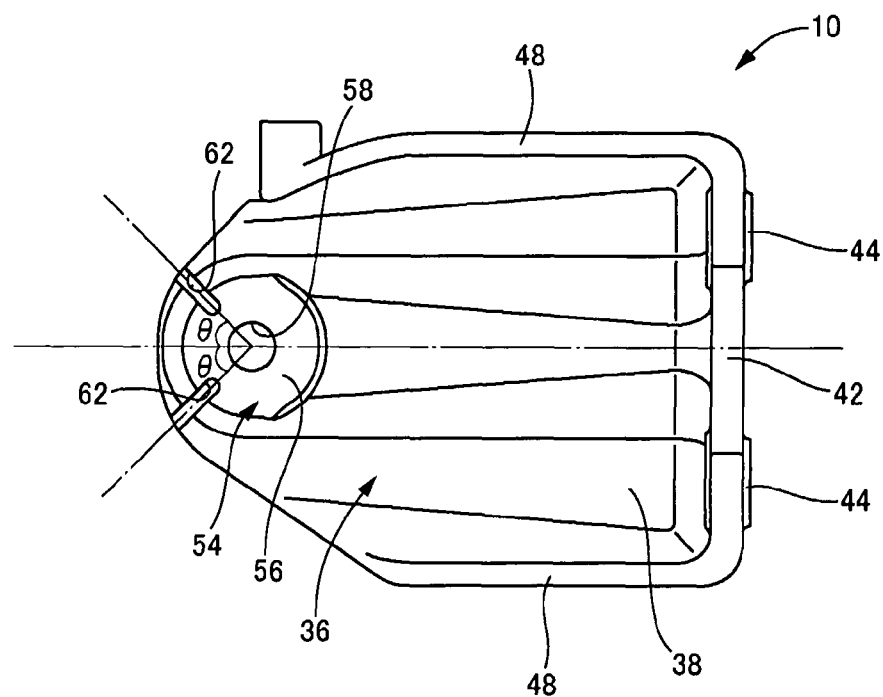
FIG. 2 is a top plane view of the engine bracket of FIG. 1.
Figure 3:
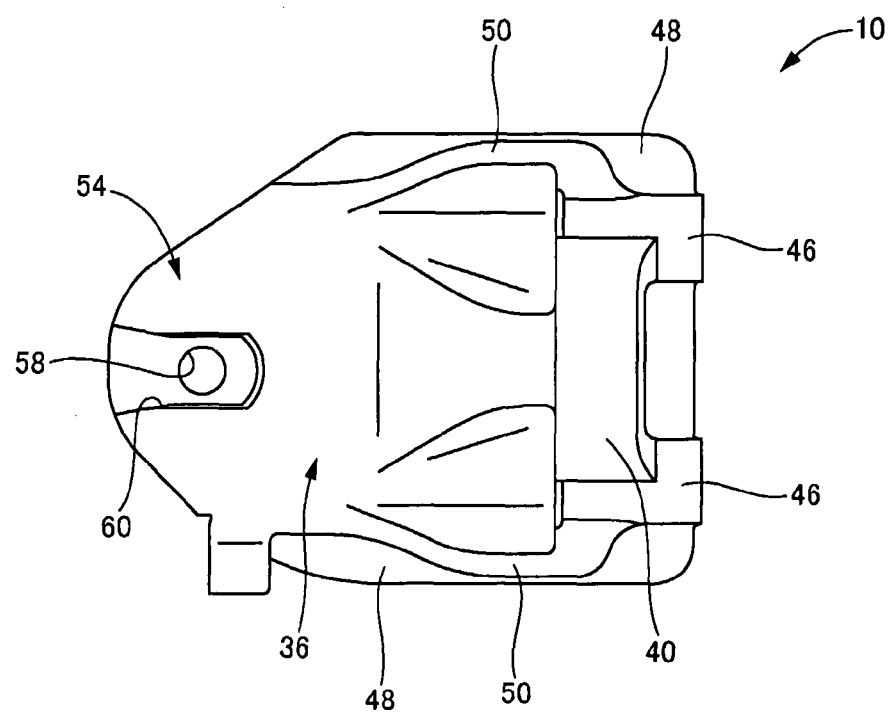
FIG. 3 is a bottom plane view of the engine bracket of FIG. 1.

More specifically, the engine bracket 10, as illustrated in FIGS. 2 and 3, has a main panel portion 36. As a whole, the main panel portion 36 is in the form of a thick panel shape, where the longitudinal direction is in the longitudinal direction of the vehicle, where the upper surface is corrugated, being wavy in the lateral direction of the vehicle (vertical direction in FIG. 2), and the lower surface is a generally flat surface. As a whole, the main panel portion 36 also gradually narrows in the vertical direction toward the rear of the vehicle.

Figure 7:
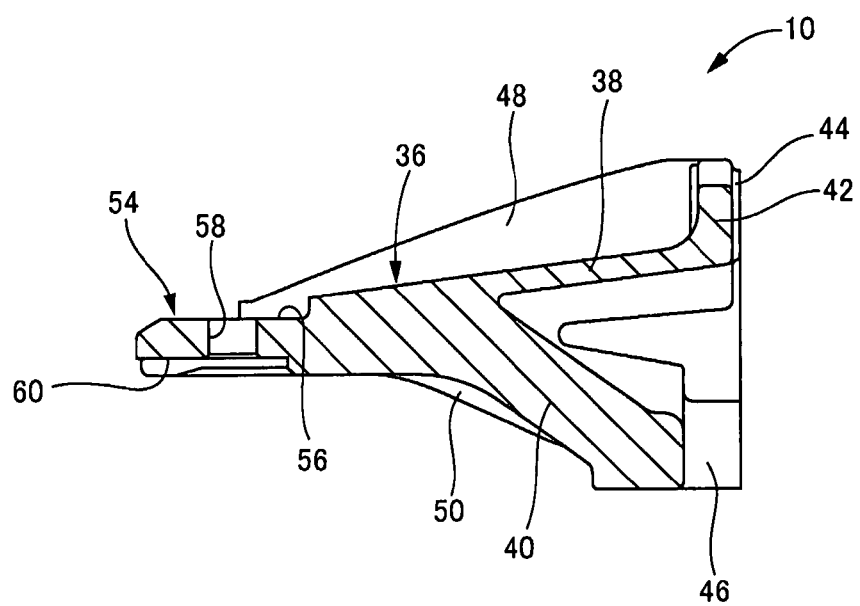
FIG. 7 is a vertical cross sectional view of the engine bracket of FIG. 1.

As illustrated in FIG. 7, the main panel portion 36 is equipped with an upper panel portion 38 and lower panel portion 40 that gradually separate vertically toward the front of the vehicle. The upper and lower panel portions 38 and 40 are formed, in the longitudinal direction of the vehicle, from a point midway in the main panel portion 36 to the front end edge, the upper panel portion 38 being include upward toward the front of the vehicle, and the lower panel portion 40 being inclined downward toward the front of the vehicle. In the present embodiment in particular, the upper panel portion 38 is in the form of a thin-walled panel, and the lower panel portion 40 is in the form of a thick-walled panel compared to the upper panel portion 38. Also, in this embodiment, the upper panel portion 38 is in the form of a wavy panel corresponding to the shape of the upper surface of the main panel portion 36, and the lower panel portion 40 is in the form of a generally flat ramp.

A fixing panel portion 42 is integrally formed at the front end edge of the upper panel portion 38. The fixing panel portion 42 is integrally formed in such a way as to rise up from the front end of the upper panel portion 38, and expands along the entire length of the upper panel portion 38 in the lateral direction of the vehicle. A pair of upper fixed portions 44 and 44 is formed at both lateral ends of the fixing panel portion 42. The upper fixed portions 44 are in the form of generally annular panels as a whole, with a center hole passing through the fixing panel 42 in the longitudinal direction of the vehicle.

A pair of lower fixed portions 46 and 46 are integrally formed apart from each other in the lateral direction with the front end of the lower panel portion 40. The lower fixed portions 46 are thick-walled generally cylindrical forms, extending linearly in the longitudinal direction. In the present embodiment, the pair of lower fixed portions 46 and 46 is positioned at either end in the lateral direction of the lower panel portion 40.

A side wall panel portion 48 serving as a reinforcing panel portion is integrally formed with both sides of the main panel portion 36 in the lateral direction of the vehicle. The side wall panel portion 48 is in the form of a stepped panel having differences in levels in the longitudinal intermediate portion, and is integrally formed with the main panel portion 36 and fixing panel portion 42. The side wall panel portion 48 also expands generally at right angles relative to the main panel portion 36 and fixing panel portion 42, and the front end of the side wall panel portion 48 is unitarily connected to the outer peripheral surface of the lower fixed portions 46 and both lateral ends of the fixing panel portion 42. The upper end surface of the side wall panel portion 48 is also located at the same height as the upper surface of the fixing panel portion 42, and the side wall panel portion 48 expands, protruding upward more than the main panel portion 36. In the present embodiment, both lateral ends of the upper panel portion 38 and both lateral ends of the lower panel portion 40 are integrally joined by the side wall panel portion 48, increasing the rigidity of the engine bracket 10. A reinforcing portion 50 that gradually curves downward toward the lateral outward direction is also integrally formed with the bottom end of the side wall panel portion 48, the rigidity of the side wall panel portion 48 being heightened by the reinforcing portion 50.

Tightening bolts 52 on the power unit side are inserted through the upper fixing portions 44 and 44 integrally formed with the fixing panel portion 42 and the lower fixing portions 46 and 46 integrally formed with the lower panel portion 40, and the tightening bolts 52 are tightened to the power unit of the automotive vehicle (not shown) so that the ends of the engine bracket 10 on the front side of the vehicle are fixed to the power unit.

An attachment panel portion 54 serving as an attachment portion is provided to the main panel portion 36 at the back side of the vehicle. The attachment panel portion 54 is formed in the midway portion of the main panel portion 36 in the lateral direction of the vehicle, and is in the form of a panel that gradually narrows laterally toward the back of the vehicle, expanding in the general horizontal direction. A generally round tightening surface 56, as viewed horizontally is formed on the upper surface in the approximate mid portion of the attachment panel portion 54. The tightening surface 56 is a flat surface expanding generally in the horizontal direction, where the back end of the tightening surface 56 is connected in the form of a curve relative to the upper surface of the main panel portion 36 which is gradually inclined upwards toward the front of the vehicle, and the front end is connected, forming a level difference.

Figure 4:
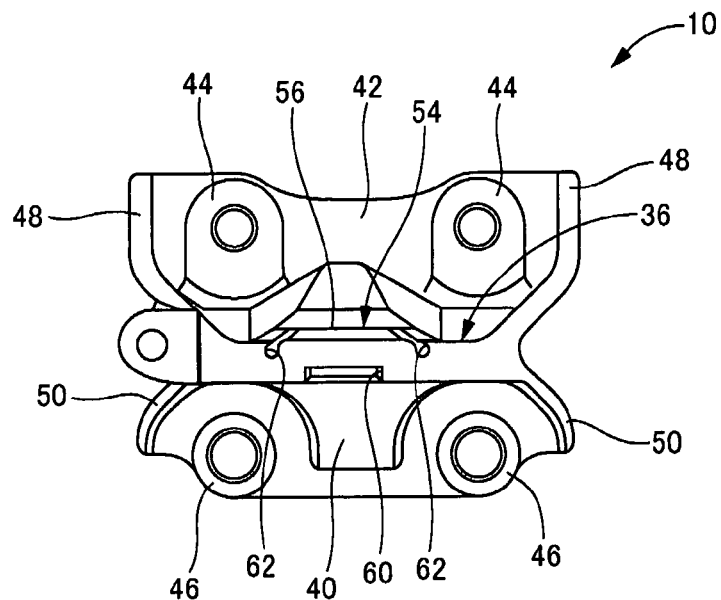
FIG. 4 is a front elevational view of the engine bracket of FIG. 1.
Figure 5:
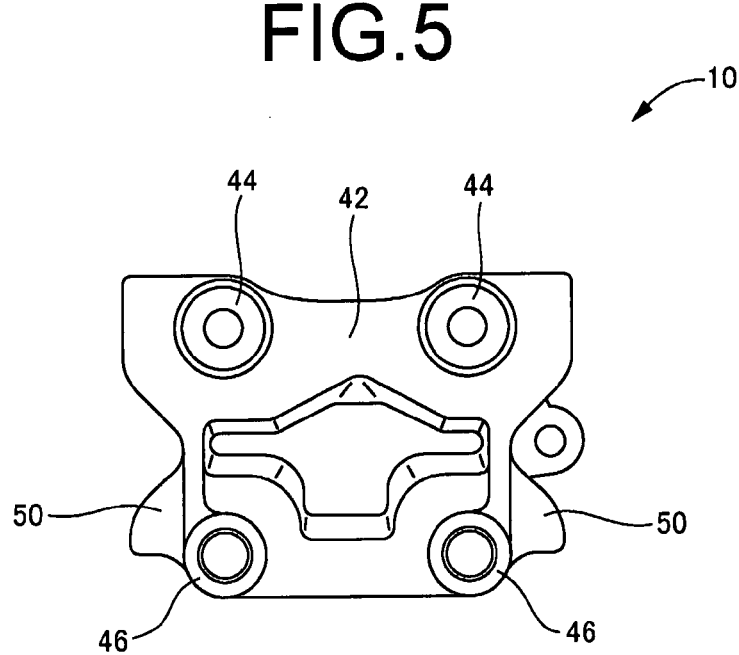
FIG. 5 is a rear elevational view of the engine bracket of FIG. 1.
Figure 6:
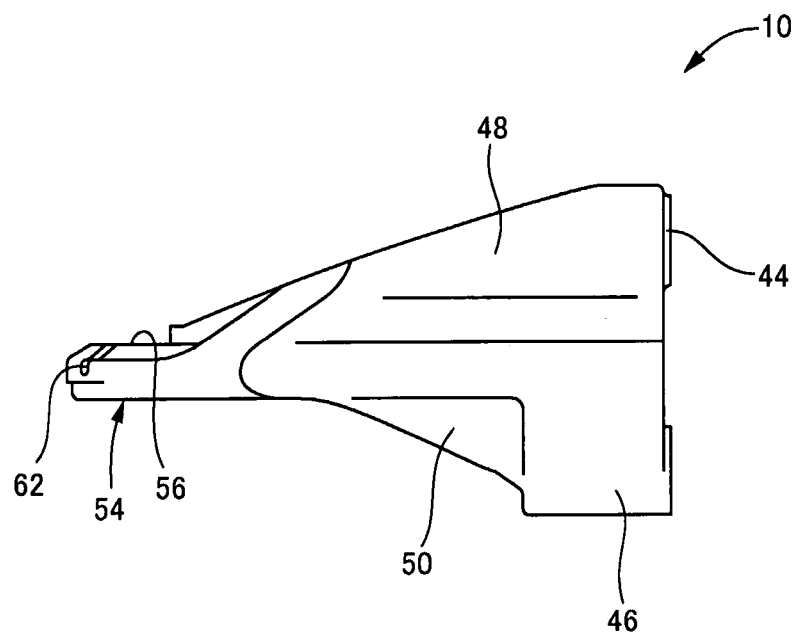
FIG. 6 is a side elevational view of the engine bracket of FIG. 1.

In the center of the tightening surface 56 is formed a bolt hole 58 passing through the attachment panel portion 54 in the thicknesswise direction of the panel (vertical direction in FIG. 4). The bolt hole 58 is a round hole of a smaller diameter than the outside diameter of the tightening surface 56, and extends at an incline so as to intersect the longitudinal direction of the vehicle, which is the direction of the load input during vehicle collisions. In the present embodiment in particular, the bolt hole 58 is formed at generally right angles to the longitudinal direction of the vehicle, and extends linearly in the vertical direction. As used here, the expression "extends at an incline so as to intersect the longitudinal direction of the vehicle" indicates that it extends in a direction that is not parallel to the longitudinal direction of the vehicle. Here, the direction at right angles to the longitudinal direction of the vehicle is included (the vehicle lateral and vertical directions).

Furthermore, as illustrated in FIG. 3, a fitting groove 60 is formed as a fitting recess in the attachment panel portion 54. The fitting groove 60 is a shallow groove open on the under side of the attachment panel portion 54, and extends a certain length from the vehicle back end side to the vehicle front side of the attachment panel portion 54. The floor surface of the fitting groove 60 is a generally horizontally expanding flat surface, with the fitting groove 60 formed to a generally constant depth along generally the entire length. The fitting groove 60 in the present embodiment gradually narrows toward the front of the vehicle along a certain length from the back end of the vehicle, the portion located on vehicle front side of the fitting groove 60 being formed at a generally constant groove width.

Furthermore, in the present embodiment, the fitting groove 60 and tightening surface 56 are formed on different sides of the attachment panel portion 54 from each other, where the fitting groove 60 and tightening surface 56 are formed in locations corresponding to each other on their sides of the attachment panel portion 54, and the bolt hole 58 formed in the attachment panel portion 54 is formed through the floor wall of the fitting groove 60, opening inside the fitting groove 60.

The engine bracket 10 is then fixedly connected to the engine mount 12. That is, as illustrated in FIG. 1, the upper end of the first mounting member 14 of the engine mount 12 is fitted from below into the fitting groove 60 which is open on the underside of the engine bracket 10, the implanted bolt 26 in the first mounting member 14 is passed through the bolt hole 58 formed through the attachment panel portion 54 of the engine bracket 10, and connecting nut 34 is screwed to the upper part of the bolt 30 of the implanted bolt 26, so that the engine bracket 10 and engine mount 12 are fixed to each other. A portion (intermediate portion) of the tightening surface 56 superposed on the connecting nut 34 in this assembled state is the surface subject to the tightening force of the fixing bolt in this embodiment.

In the present embodiment in particular, although not necessarily apparent in the figure, a pair of flat surfaces that expand a certain length in the peripheral direction is formed radially opposite in one direction in the outer peripheral surface of the protruding leading end (upper end in FIG. 1) of the first mounting member 14. As a result, the first mounting member 14 has two surface widths at the protruding leading end portion. The distance between the pair of flat surfaces is shorter than the dimensions of the outside diameter of the first mounting member 14 and is generally equivalent to the dimensions of the width of the fitting groove 60. The pair of flat surfaces of the first mounting member 14 is positioned so as to face each other in the widthwise direction of the fitting groove 60, and the protruding leading end of the first mounting member 14 is fitted into the fitting groove 60, so that the first mounting member 14 is prevented from rotating around the implanted bolt 26 relative to the engine bracket 10 by the friction between the flat surfaces and the side wall surface of the fitting groove 60.

As illustrated above, the engine bracket 10 fixed to the power unit of the automotive vehicle (not shown) and the engine mount 12 fixed to the body of the automotive vehicle (similarly not shown) are fixed to each other, so that the power unit is connected by the engine bracket 10 to the vehicle body. Furthermore, the engine mount 12 is of construction such that the first mounting member 14 and second mounting member 16 are elastically connected by the main rubber elastic body 18, the first mounting member 14 is fixed to the power unit side by the engine bracket 10, and the second mounting member 16 is fixed to the vehicle body side by the outer bracket 22, allowing the power unit to be elastically joined to and supported by the vehicle body. Furthermore, as is thus apparent from this, the vehicle body is fixed by the engine mount 12 to the attachment panel portion 54 of the engine bracket 10, and the fixing member on the vehicle body side in this embodiment is formed by the engine mount 12.

It should be noted that breaking guide grooves 62 are formed as breaking grooves, as illustrated in FIG. 2, in the attachment panel portion 54 of the engine bracket 10. The breaking guide grooves 62 are formed, opening out in the upper surface, in the vehicle back side of the attachment panel portion 54 of the engine bracket 10, and extend linearly outward from an outer peripherally spaced apart location of the bolt hole 58. The breaking guide grooves 62 in this embodiment are formed with a generally constant groove width.

The ends on the inner peripheral side (bolt hole 58 side) of the breaking guide grooves 62 in this embodiment also extend on the tightening surface 56, and are formed farther on the radial outside than the seating surface which is subject to the tightening force of the connecting nut 34. The portion where the under side (seating surface) of the tightening nut 34 overlaps the tightening surface 56 is a flat surface where no breaking guide grooves 62 are formed.

Furthermore, in the present embodiment, the breaking guide grooves 62 are formed in a region outside the fitting groove 60. The set of breaking guide grooves 62 and 62 are formed further outside in the lateral direction of the vehicle than the fitting groove 60 in the surface opposite the fitting groove 60. The attachment panel portion 54 can thus avoid becoming too thinned out in some parts by both the fitting groove 60 and the breaking guide grooves 62.

In the present embodiment, the ends of the breaking guide grooves 62 on the outer peripheral side (vehicle longitudinal side of the attachment panel portion 54) open on the outer peripheral surface of the attachment panel portion 54 on the back end side. Also in this embodiment, the breaking guide grooves 62 are formed so as to gradually become shallower toward the outer peripheral side, and the floor surface of the breaking guide grooves 62 is a generally horizontally expanding flat surface.

Also in the present embodiment, a pair of breaking guide grooves 62 extending out in different directions from each other are formed as the breaking grooves. The pair of breaking guide grooves 62 are generally the same groove shape in this embodiment.

Both breaking guide grooves 62, 62 also gradually extend outward at an incline in the lateral direction of the vehicle toward the rear in the longitudinal direction of the vehicle. Furthermore, as illustrated in FIG. 2, both breaking guide grooves 62, 62 extend in second directions at an angle of gradient relative to a first direction in which the load acts on the implanted bolt 26 during vehicle collisions, the angle preferably being $20° \leq \theta \leq 60°$, and more preferably $40° \leq \theta \leq 50°$. In this embodiment in particular, the angle $\theta = 45°$, the pair of breaking guide grooves 62, 62 being formed so as to extend in directions perpendicular to each other.

When the impact load during vehicle collisions is exerted on the engine bracket 10 equipped with such a pair of breaking guide grooves 62, 62, the engine bracket 10 will break along the breaking guide grooves 62. The linkage between the power unit and vehicle body will thus break down, allowing the power unit to become separated from the vehicle body.

Figure 8:
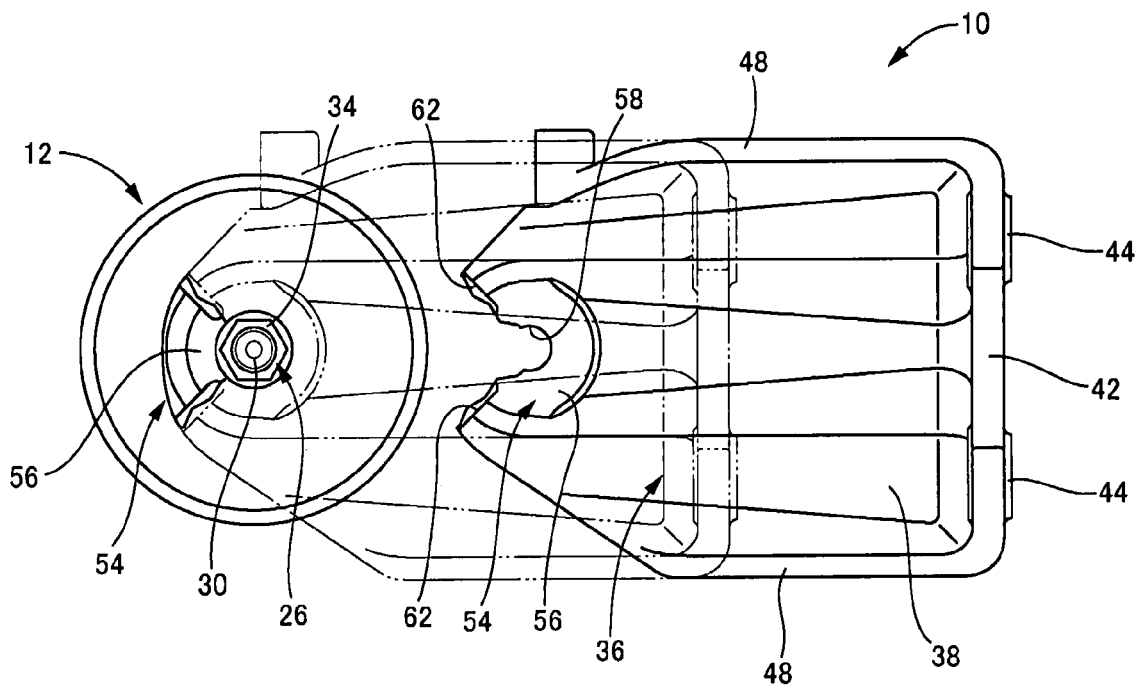
FIG. 8 is an illustration showing a broken state of the engine bracket of FIG. 1.

More specifically, when impact occurs while traveling in a vehicle, for example, the vehicle body will abruptly come to rest, while the power unit will become displaced in the longitudinal direction of the vehicle. In the present embodiment in particular, the breaking guide grooves 62, 62 are formed in the parts where the engine bracket 10 and engine mount 12 are joined, partially decreasing the strength of the engine bracket 10. The engine bracket 10 thus breaks along the breaking guide grooves 62, as illustrated in FIG. 8, as a result of the load acting between the power unit and the vehicle body. Accordingly, the power unit fixed to the engine bracket 10 is independently separated from the vehicle, on the front side of the vehicle, along with the portion of the engine bracket 10 located more toward the front end of the vehicle than the implanted bolt 26. It is thus possible to prevent passenger injury and the like resulting from the intrusion of the power unit into the cab (further toward the rear side of the vehicle than the power unit) during vehicle collisions, better ensuring passenger safety during collisions. In FIG. 8, the state prior to the engine bracket 10 breakage is indicated by the double dotted chain line, and the state after breakage is indicated by the solid line.

The breaking guide grooves 62 are formed in the engine bracket 10 constructed according to the present embodiment in this way so as to allow the engine bracket 10 to consistently be broken as designed by the action of the load during collisions. Passengers' safety during vehicle collisions can therefore be ensured with greater reliability.

The pair of breaking guide grooves 62, 62 that are provided also extend in different directions from each other, both being formed so as to extend at an incline at a certain angle of gradient relative to the direction in which the load acts on the implanted bolt 26 during collisions. This can ensure more reliable breakage of the engine bracket 10 by the action of the load during collisions, thus ensuring even better passenger safety during collisions.

In the engine bracket 10 in this embodiment, the pair of breaking guide grooves 62, 62 are formed in a region further outside the seating surface of the connecting nut 34 in the tightening surface 56 of the attachment panel portion 54. Thus forming the breaking guide grooves 62 will ensure greater area in the seating surface of the connecting nut 34 while ensuring safety during collisions, and will allow the engine bracket 10 and engine mount 12 to be beneficially joined during ordinary conditions (in the absence of collisions). It is thus possible to ensure stable vibration damping support of the power unit relative to the vehicle body during normal collision-free operation in particular.

Moreover, in the present embodiment, the pair of breaking guide grooves 62, 62 are formed in a region to the outside of the fitting groove 60 that is formed in the attachment panel portion 54, and in the region subject to the tightening force of the connecting nut 34 both surfaces of the attachment panel portion 54 are generally horizontally expanding flat surfaces. It is thus possible to prevent a loss of surface area in the region subject to the tightening force of the connecting nut 34 as a result of the formation of the breaking guide grooves 62, 62, thereby ensuring safety during collisions and stable vibration damping support of the power unit.

In addition, the bolt hole 58 formed in the attachment panel portion 54 is formed so as to intersect the longitudinal direction of the vehicle, which is the direction of the load input during vehicle collisions, and the implanted bolt 26 inserted into the bolt hole 58 extends at right angles to the direction in which the collision load acts. The load acting between the vehicle body and power unit during vehicle collisions thus acts efficiently on the rear end of the attachment panel portion 54 located between the breaking guide grooves 62, 62. It is thus possible to ensure that the engine bracket 10 will consistently break as intended in the locations where the breaking guide grooves 62, 62 are formed.

Figure 9:
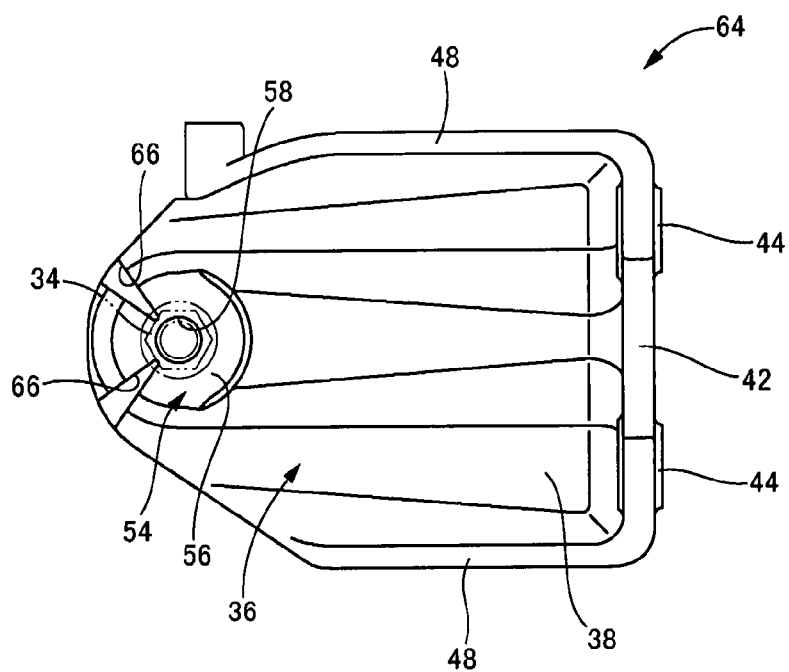
FIG. 9 is a top plane view of an engine bracket of construction according to a second embodiment of the invention.

Referring next to FIG. 9, there is illustrated an automotive vehicle engine bracket 64 according to a second embodiment of the present invention. In the following description, the same reference numerals as used in the illustrated embodiment are used for identifying structurally and functionally corresponding elements, and therefore will not be further described.

That is, in the engine bracket 64 of this embodiment, breaking guide grooves 66 are formed as the breaking grooves in the attachment panel portion 54. The breaking guide grooves 66 extend from the outer peripheral edge of the attachment panel portion 54 toward the bolt hole 58, and extend generally linearly to positions a certain distance apart on the outer periphery of the bolt hole 58.

As illustrated in FIG. 9, the breaking guide grooves 66 in this embodiment are in the form of grooves that gradually narrow from the outer peripheral edge of the attachment panel portion 54 toward the bolt hole 58 side. Although not shown in the figure, the floor surface of the breaking guide grooves 66 is a slope inclined from the outer peripheral edge of the attachment panel portion 54 toward the bolt hole 58 side, and the breaking guide grooves 66 gradually become shallower toward the bolt hole 58 side. In this way, the groove cross surface area of the breaking guide grooves 66 in this embodiment gradually becomes smaller from the outer peripheral edge of the attachment panel portion 54 toward the bolt hole 58 side.

While the engine bracket 64 of this embodiment is mounted on the engine mount 12, the breaking guide grooves 66 are formed to a length reaching the outer periphery of the seating surface of the connecting nut 34 (the surface subject to the tightening force resulting from the implanted bolt 26 being screwed to the connecting nut 34 in the attachment panel portion 54) represented by the double dotted chain line in FIG. 9. In other words, the ends of the breaking guide grooves 66 are formed on the bolt hole 58 side in the outer periphery of the seating surface of the connecting nut 34 in the attachment panel portion 54.

In the automotive vehicle engine bracket 64 constructed according to this embodiment, the surface area of the seating surface of the connecting nut 34 can be beneficially ensured so as to ensure that the engine bracket 64 is attached to the engine mount 12 during normal collision-free operation in the same manner as in the first embodiment, and the breakage of the attachment panel portion 54 by means of the breaking guide grooves 66 during collisions can prevent the power unit from intruding into the cab, ensuring better passenger safety.

The breaking guide grooves 66 in the present embodiment are also formed to a length reaching the seating surface of the connecting nut 34, thus allowing the breaking strength of the attachment panel portion 54 to be adjusted to ensure even better safety during collisions. The breaking guide grooves 66 are also formed a certain distance apart in the outer periphery of the bolt hole 58, ensuring a beneficial surface area in the seating surface of the connecting nut 34 to bring about the needed fixing force in the engine bracket 64 relative to the engine mount 12.

In this embodiment in particular, the widthwise dimensions of the breaking guide grooves 66 gradually become smaller toward the bolt hole 58 side, and the depth gradually becomes shallower toward the bolt hole 58 side. With this arrangement, the ends of the breaking guide grooves 66 can be positioned on the seating surface of the connecting nut 34 to reduce the loss of area in the seating surface of the connecting nut 34, making it possible to ensure greater strength in the attachment panel portion 54 in the parts subject to the tightening force of the connecting nut 34. The engine bracket 64 can thus be more consistently fixed to the engine mount 12 during normal collision-free operation.

While the present invention has been described in detail in its presently preferred embodiment, for illustrative purpose only, it is to be understood that the invention is by no means limited to the details of the illustrated embodiment, but may be otherwise embodied.

For instance, in the first and second embodiments, the pair or set of breaking guide grooves 62, 62 (66, 66) were formed so as to be open on the surface opposite the fitting groove 60 in the attachment panel portion 54, but the breaking guide grooves 62 need not necessarily be formed in the surface opposite the fitting groove 60. A set of breaking guide grooves 70, 70 may be formed in the same side as the fitting groove 60, as in the engine bracket 68 illustrated in FIG. 10. Furthermore, in the engine bracket 68, the portion overlapping the upper end surface of the first mounting member 14 in the upper floor wall of the fitting groove 60 is the surface subject to the tightening force of the fixing bolt. Additionally, as illustrated in FIG. 10, when the breaking guide grooves 70, 70 are formed in the same surface as the fitting groove 60, the breaking guide grooves 70, 70 are preferably formed in a region to the outside of the portion where the fitting groove 60 is formed.

Figure 10:
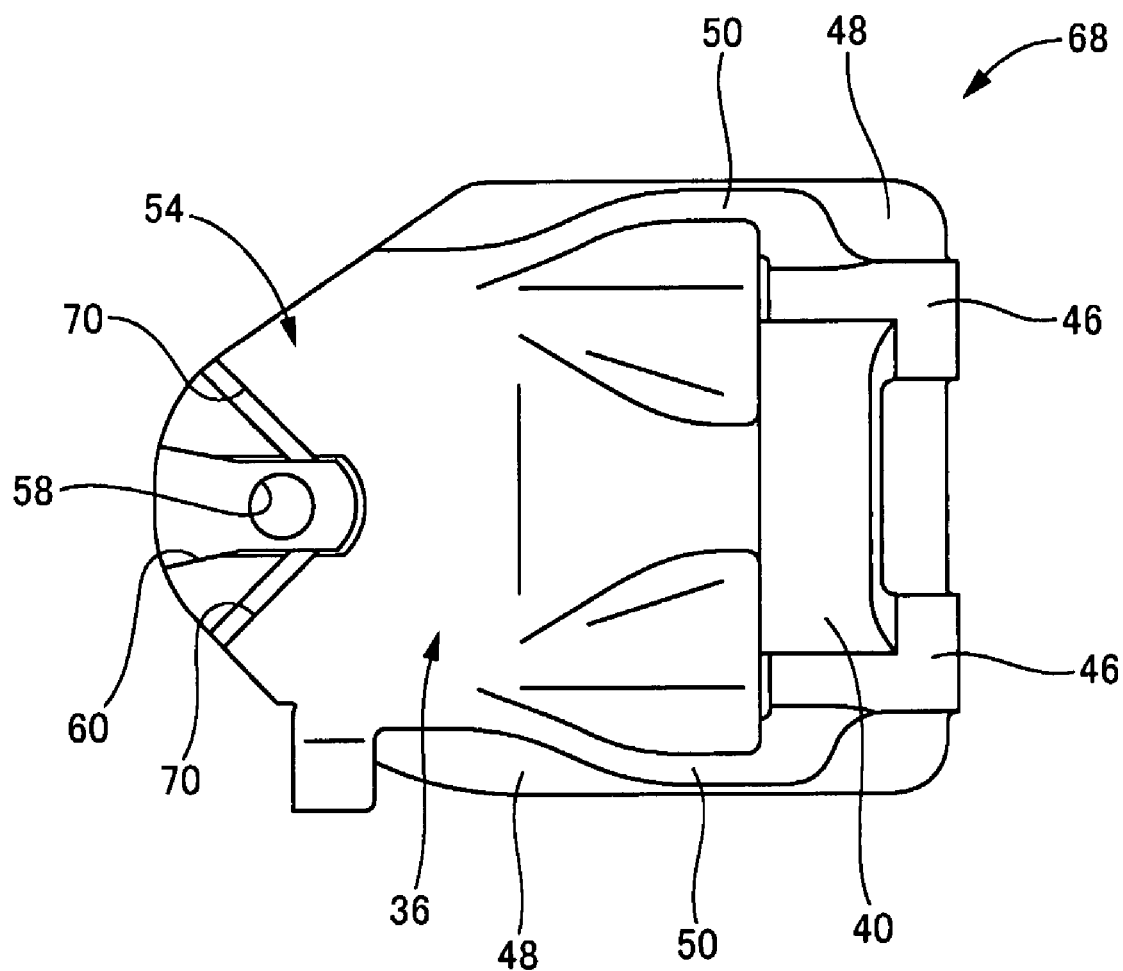
FIG. 10 is a bottom plane view of the engine bracket of construction according to other embodiment of the invention.

As also illustrated in FIG. 10, one end of the pair of breaking guide grooves 70, 70 may be connected so as to open in the side wall of the fitting groove 60. The breaking guide grooves 70, 70 are formed in a region to the outside of the fitting groove 60, including cases in which this joined structure is adopted.

It should be appreciated that at the same time the breaking guide grooves 62, 62 are formed in one side of the attachment panel portion 54, the breaking guide grooves 70, 70 may also be formed in the other side.

The number of breaking guide grooves 62 formed in the main panel portion 36 is not necessarily limited to the two formed in the above embodiments. A plurality of three or more breaking guide grooves 62 may be formed, or a single breaking guide groove 62 may be formed.

In the first and second embodiments, the back end of the engine bracket 10 in the longitudinal direction of the vehicle was joined to the vehicle body, and the front end was joined to the power unit, but the parts joined to the vehicle body or power unit may be formed in other parts other than the ends in the longitudinal direction of the vehicle, such as the ends of the engine bracket 10 in the lateral direction of the vehicle.

Also, in the first and second embodiments, the specific example was of an engine bracket 10 in the form of a plate as a whole, but the specific shape of the engine bracket is not in any way limited to the descriptions in the embodiments. The present invention can be adapted to a variety of engine brackets having known structures.

In addition, in the first and second embodiments, a headless implanted bolt 26 was used as the fixing bolt, and the breaking guide grooves 62 were formed in a region apart from the portion where the tightening force of the implanted bolt 26 was affected by the connecting nut 34, but bolts with heads can also, of course, be used as fixing bolts. For example, when a fixing bolt with a head is used, where the fixing bolt is inserted into the bolt hole 58 and the fixing bolt is screwed to the bolt hole 20 of the first mounting member 14 so that the engine bracket 10 is attached to the engine mount 12, the surface on which the head of the fixing bolt is superposed in the attachment panel portion 54 is the surface subject to the tightening force of the fixing bolt.

In the above embodiments, the pair of breaking guide grooves 62, 62 having groove configurations equivalent to each other were formed as the breaking grooves, but when a plurality of breaking grooves are formed, the plurality of breaking grooves may be formed in shapes that are different from each other. Specifically, for example, the plurality of breaking grooves may have groove cross sectional shapes, sizes, lengths, or the like that are different from each other.

The breaking guide grooves 62 in the first and second embodiments above were in the form of generally linearly extending grooves, but the breaking guide grooves are not limited to linear grooves and may extend which arched, curved, or the like. The configuration of the breaking guide grooves may also be established as desired according to the engine bracket configuration or the like.

Also, the breaking grooves need not necessarily be formed with a certain cross sectional shape or area, as indicated in the second embodiment above. That is, for example, parts of the breaking grooves formed in regions subject to the tightening force of the fixing bolt and parts formed in regions further toward the outer periphery than the region subject to the tightening force of the fixing bolt may have different cross sectional area or configurations. This will allow the fixing strength and breaking strength of the engine bracket to be more efficiently controlled.

In the first and second embodiments, the fitting groove 60 was given as the fitting recess, but the fitting recess need not necessarily be in the form of a groove. Fitting holes and the like in the form of holes may be formed as the fitting recess.

It is also to be understood that the present invention may be embodied with various other changes, modifications and improvements, which may occur to those skilled in the art, without departing from the spirit and scope of the invention defined in the following claims.

What is claimed is:

1. An engine bracket that is installed between a vehicle body and a power unit for the vibration damping support of the power unit relative to the vehicle body, the engine bracket comprises:
    an attachment portion provided in a fixing location adapted to be fixed to at least one of the vehicle body and power unit;
    a bolt hole being formed in the attachment portion so that the attachment portion is fixed to the vehicle body or power unit by a fixing bolt inserted into the bolt hole; and
    at least one breaking groove formed at an area located spaced away from the bolt hole so as to extend away from the bolt hole and toward an outer peripheral edge of the attachment portion on at least one of opposite surfaces of the attachment portion in a direction in which the fixing bolt is inserted.

2. The engine bracket according to claim 1, wherein the breaking groove is formed in a region outside an outer peripheral side of a surface subject to a tightening force of the fixing bolt in the attachment portion.

3. The engine bracket according to claim 1, wherein one end of the breaking groove on a bolt hole side is formed in a surface subject to a tightening force of the fixing bolt in the attachment portion.

4. The engine bracket according to claim 1, wherein the attachment portion includes a fitting recess formed in a surface on which is superposed a fixing member of the power unit or vehicle body in a direction in which the fixing bolt is inserted in the attachment portion for preventing the fixing member from rotating around the fixing bolt, and the breaking groove is formed in a region to an outside of the fitting recess.

5. The engine bracket according to claim 1, wherein a first direction in which a load acts on the fixing bolt during vehicle collisions and a second direction in which the breaking groove extends are at an angle $\theta$ of $20° \leqq \theta \leqq 60°$.

6. The engine bracket according to claim 1, wherein the at least one breaking groove comprises a plurality of breaking grooves.

7. The engine bracket according to claim 1, wherein the at least one breaking grooves comprise two breaking grooves, and the two breaking grooves are slant with respect to a first direction in which the load acts on the fixing bolt during vehicle collisions with a same angle.

8. The engine bracket according to claim 1, wherein the attachment portion is of panel shape that expands horizontally, and the bolt hole is formed vertically through the attachment portion.

9. The engine bracket according to claim 1, further comprising: a main panel portion extending in a longitudinal direction of the vehicle, wherein the attachment portion is formed integrally at one end of the main panel portion in the longitudinal direction of the vehicle, one of the power unit and vehicle body being fixable thereto, and a fixing panel portion that expands in a lateral direction of the vehicle at right angles to the main panel portion is formed integrally with the other end of the main panel portion in the longitudinal direction of the vehicle, an other of the power unit and vehicle body being fixable thereto.

10. The engine bracket according to claim 9, further comprising a reinforcing panel portion integrally formed with the main panel portion and fixing panel portion, and extending perpendicularly to both of the main panel portion and fixing panel portion.

11. An engine bracket for connecting a power unit to a body of an automotive vehicle via an engine mount, comprising:
    a main panel portion extending in a longitudinal direction of the vehicle, and having an attachment portion formed at a rear end of the main panel portion in the longitudinal direction of the vehicle, the attachment portion having a bolt hole extending orthogonal to the longitudinal direction of the vehicle, and being fixable to the body of the vehicle by a fixing bolt inserted into the bolt hole;
    a fixing panel portion that expands in a lateral direction of the vehicle at right angles to the main panel portion is formed integrally with a front end of the main panel portion in the longitudinal direction of the vehicle, and being fixable to the power unit; and
    a pair of breaking grooves formed at an area located spaced away from the bolt hole so as to extend in respective radially outward directions of the bolt hole to an outer peripheral edge of the rear end of the main panel portion in the longitudinal direction of the vehicle, the respective radially outward directions are at an angle $\theta$ of $20° \leqq \theta \leqq 60°$ with respect to the longitudinal direction of the vehicle in which a load acts on the fixing bolt during vehicle collisions.

12. The engine bracket according to claim 1, wherein an end on an inner peripheral side of the breaking guide groove is formed farther on a radial outside than the bolt hole with a radial gap therebetween.

13. The engine bracket according to claim 11, wherein an end on an inner peripheral side of each breaking guide groove is formed farther on a radial outside than the bolt hole with a radial gap therebetween.

* * * * *